United States Patent
Hedman et al.

(10) Patent No.: US 10,034,327 B2
(45) Date of Patent: Jul. 24, 2018

(54) METHOD AND APPARATUS IN A TELECOMMUNICATION SYSTEM

(71) Applicant: Telefonaktiebolaget LM Ericsson (publ), Stockholm (SE)

(72) Inventors: Peter Hedman, Helsingborg (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/424,778

(22) Filed: Feb. 3, 2017

(65) Prior Publication Data

US 2017/0150547 A1    May 25, 2017

Related U.S. Application Data

(62) Division of application No. 14/391,450, filed as application No. PCT/SE2014/050843 on Jul. 3, 2014, now Pat. No. 9,578,476.

(Continued)

(51) Int. Cl.
*H04W 76/25* (2018.01)
*H04W 76/04* (2009.01)
(Continued)

(52) U.S. Cl.
CPC .......... *H04W 76/25* (2018.02); *H04W 4/005* (2013.01); *H04W 4/70* (2018.02); *H04W 76/045* (2013.01); *H04W 76/048* (2013.01); *H04W 76/28* (2018.02)

(58) Field of Classification Search
CPC . H04W 76/045; H04W 4/005; H04W 76/048; H04W 76/25; H04W 4/70; H04W 76/28
See application file for complete search history.

(56) References Cited

U.S. PATENT DOCUMENTS 7,436,779 B1    10/2008   Mangal et al.
8,743,752 B2    6/2014    Zhou et al.
(Continued)

FOREIGN PATENT DOCUMENTS

EP    2571299 A1      3/2013
WO    2012153211 A1   11/2012
WO    2013006346 A2   1/2013

OTHER PUBLICATIONS

3GPP TR 23.887 V1.0.0 (Jun. 2013) Technical Specification Group Services and System Aspects (Release 12), Study on Machine-Type Communications (MTC) and other mobile data applications communications enhancements, 133 pages.
(Continued)

*Primary Examiner* — Ian N Moore
*Assistant Examiner* — Latresa McCallum
(74) *Attorney, Agent, or Firm* — NDWE LLP

(57) ABSTRACT

Exemplary methods in a network node of a radio access network (RAN) in a telecommunication system include receiving an indication from a network node in a core network that mobile terminated data is pending for a user equipment (UE), receiving a connection request from the UE, setting up a radio resource control (RRC) connection to the UE, releasing the RRC connection to the UE, setting a release timer value to a value sufficient to establish a mobile terminated communication by the network to the UE, and releasing the RRC connection to the UE when the release timer has expired. Exemplary methods in a network node of a RAN in a telecommunication system include keeping UE that is configured for long discontinuous reception (DRX) in idle mode, in RRC connected mode long enough to allow a network stored mobile terminated short message service (MT SMS) to be received by the UE.

5 Claims, 7 Drawing Sheets

Related U.S. Application Data

(60) Provisional application No. 61/844,121, filed on Jul. 9, 2013.

(51) Int. Cl.
   *H04W 4/00* (2018.01)
   *H04W 4/70* (2018.01)
   H04W 76/28 (2018.01)

(56) References Cited

U.S. PATENT DOCUMENTS

| | | | | |
|---|---|---|---|---|
| 2003/0236094 | A1* | 12/2003 | Jami | H04W 76/068 |
| | | | | 455/450 |
| 2006/0106865 | A1 | 5/2006 | Beming et al. | |
| 2009/0247176 | A1 | 10/2009 | Song et al. | |
| 2011/0103310 | A1 | 5/2011 | Stojanovski et al. | |
| 2012/0257571 | A1* | 10/2012 | Liao | H04W 4/005 |
| | | | | 370/328 |
| 2012/0315874 | A1* | 12/2012 | Li | H04W 48/02 |
| | | | | 455/411 |
| 2013/0128873 | A1 | 5/2013 | Eipe et al. | |
| 2014/0016614 | A1 | 1/2014 | Velev et al. | |
| 2015/0282082 | A1* | 10/2015 | Landais | H04W 52/0222 |
| | | | | 370/311 |

OTHER PUBLICATIONS

3GPP TS 23.060 V12.1.0 (Jun. 2013), General Packet Radio Service (CPRS); Service Description; Stage 2 (Release 12), 3rd Generation Partnership Project; Technical Specification Group Services and System Aspects, 338 pages.

3GPP TS 44.018 V11.5.0 (May 2013), Mobile Radio Interface Layer 3 Specification; Radio Resource Control (RRC) Protocol (Release 11), 3rd Generation Partnership Project; Technical Specification Group GSM/EDGE Radio Access Network, 467 pages.

3rd Generation Partnership Project; Technical Specification Group Services and System Aspects; Circuit Switched (CS) fallback in Evolved Packet System (EPS); Stage 2 (Release 11), 3GPP TS 23.272, V11.4.0, 3GPP Organizational Partners, 2013, 91 pages.

Circuit Switched (CS) fallback in Evolved Packet System (EPS); Stage 2, 3GPP TS 23.272 V11.9.0, 3rd Generation Partnership Project, Technical Specification Group Services and System Aspects (Release 11), 2014, 99 pages.

General Packet Radio Service (GPRS) enhancements for Evolved Universal Terrestrial Radio Access Network (E-UTRAN) access 3GPP TS 23.401 V12.1.0, 3rd Generation Partnership Project, Technical Specification Group Services and System Aspects (Release 12), 2013, 291 pages.

Non-Final Office Action from U.S. Appl. No. 14/391,450, dated May 20, 2016, 46 pages.

Notice of Allowance from U.S. Appl. No. 14/391,450, dated Oct. 7, 2016, 19 pages.

Notification of Transmittal of International Preliminary Report on Patentability for Application No. PCT/SE2014/050843, dated May 30, 2016, 7 pages.

PCT International Search Report and Written Opinion for Counterpart PCT Application No. PCT/SE2014/050843, dated Mar. 5, 2015, 7 pages.

Re-transmission and reachability aspects when using long DRX cycle in idle mode, S2-132464, SA WG2 Meeting S2#98, 2013, 6 pages.

Technical Specification Group Core Network and Terminals (Release 12) Mobile radio interface Layer 3 specification; Core network protocols; Stage 33GPP TS 24.008 V12.2.0, 3rd Generation Partnership Project, 2013, 682 pages.

Technical Specification Group Core Network and Terminals (Release 12) Non-Access-Stratum (NAS) protocol for Evolved Packet System (EPS); Stage 3GPP TS 24.301 V12.1.0, 3rd Generation Partnership Project, 2013, 350 pages.

Written Opinion of the International Preliminary Examining Authority, Application No. PCT/SE2014/050843, dated Mar. 2, 2016, 5 pages.

* cited by examiner

Table 10.2.2: EPS mobility management timers – network side

| TIMER NUM. | TIMER VALUE | STATE | CAUSE OF START | NORMAL STOP | ON THE 1st, 2nd, 3rd, 4th EXPIRY (NOTE 1) |
|---|---|---|---|---|---|
| T3413 | NOTE 2 | EMM-REGISTERED | Paging procedure for EPS services initiated | Paging procedure for EPS services completed | Network dependent |
| T3422 | 6s | EMM-DEREGISTERED-INITIATED | DETACH REQUEST sent | DETACH ACCEPT received | Retransmission of DETACH REQUEST |
| T3450 | 6s | EMM-COMMON-PROC-INIT | ATTACH ACCEPT sent<br><br>TRACKING AREA UPDATE ACCEPT sent with GUTI<br><br>TRACKING AREA UPDATE ACCEPT sent with TMSI<br><br>GUTI REALLOCATION COMMAND sent | ATTACH COMPLETE received<br>TRACKING AREA UPDATE COMPLETE received<br>GUTI REALLOCATION COMPLETE received | Retransmission of the same message type, i.e. ATTACH ACCEPT, TRACKING AREA UPDATE ACCEPT or GUTI REALLOCATION COMMAND |
| T3460 | 6s | EMM-COMMON-PROC-INIT | AUTHENTICATION REQUEST sent<br><br>SECURITY MODE COMMAND sent | AUTHENTICATION RESPONSE received<br>AUTHENTICATION FAILURE received<br>SECURITY MODE COMPLETE received<br>SECURITY MODE REJECT received | Retransmission of the same message type, i.e. AUTHENTICATION REQUEST or SECURITY MODE COMMAND |
| T3470 | 6s | EMM-COMMON-PROC-INIT | IDENTITY REQUEST sent | IDENTITY RESPONSE received | Retransmission of IDENTITY REQUEST |
| Mobile reachable | NOTE 4 | All except EMM-DEREGISTERED | Entering EMM-IDLE mode | NAS signalling connection established | Network dependent, but typically paging is halted on 1st expiry if the UE is not attached for emergency bearer services.<br><br>Implicitly detach the UE which is attached for emergency bearer services. |
| Implicit detach timer | NOTE 3 | All except EMM-DEREGISTERED | The mobile reachable timer expires while the network is in EMM-IDLE mode | NAS signalling connection established | Implicitly detach the UE on 1st expiry |

NOTE 1: Typically, the procedures are aborted on the fifth expiry of the relevant timer. Exceptions are described in the corresponding procedure description.
NOTE 2: The value of this timer is network dependent.
NOTE 3: The value of this timer is network dependent. If ISR is activated, the default value of this timer is 4 minutes greater than T3423.
NOTE 4: The default value of this timer is 4 minutes greater than T3412. If T3346 is larger than T3412 and the MME includes timer T3346 in the TRACKING AREA UPDATE REJECT message or SERVICE REJECT message, the value of the Mobile reachable timer is 4 minutes greater than T3346. If the UE is attached for emergency bearer services, the value of this timer is set equal to T3412.

Figure 2

Table 10.3.2: EPS session management timers – network side

| TIMER NUM. | TIMER VALUE | STATE | CAUSE OF START | NORMAL STOP | ON THE 1st, 2nd, 3rd, 4th EXPIRY (NOTE 1) |
|---|---|---|---|---|---|
| T3485 | 8s | BEARER CONTEXT ACTIVE PENDING | ACTIVATE DEFAULT EPS BEARER CONTEXT REQUEST sent<br><br>ACTIVATE DEDICATED EPS BEARER CONTEXT REQUEST sent | ACTIVATE DEFAULT EPS BEARER CONTEXT ACCEPT received or ACTIVATE DEFAULT EPS BEARER CONTEXT REJECT received or ACTIVATE DEDICATED EPS BEARER CONTEXT ACCEPT received or ACTIVATE DEDICATED EPS BEARER CONTEXT REJECT received | Retransmission of the same message |
| T3486 | 8s | BEARER CONTEXT MODIFY PENDING | MODIFY EPS BEARER CONTEXT REQUEST sent | MODIFY EPS BEARER CONTEXT ACCEPT received or MODIFY EPS BEARER CONTEXT REJECT received | Retransmission of MODIFY EPS BEARER CONTEXT REQUEST |
| T3489 | 4s | PROCEDURE TRANSACTION PENDING | ESM INFORMATION REQUEST sent | ESM INFORMATION RESPONSE received | Retransmission of ESM INFORMATION REQUEST on 1st and 2nd expiry only |
| T3495 | 8s | BEARER CONTEXT INACTIVE PENDING | DEACTIVATE EPS BEARER CONTEXT REQUEST sent | DEACTIVATE EPS BEARER CONTEXT ACCEPT received | Retransmission of DEACTIVATE EPS BEARER CONTEXT REQUEST |
| NOTE 1: | Typically, the procedures are aborted on the fifth expiry of the relevant timer. Exceptions are described in the corresponding procedure description. | | | | |

Figure 3

METHOD AND APPARATUS IN A TELECOMMUNICATION SYSTEM

CROSS-REFERENCE TO RELATED APPLICATIONS

This application is a divisional application of U.S. application Ser. No. 14/391,450, filed Oct. 9, 2014, which is a National stage of International Application No. PCT/SE2014/050843, filed Jul. 3, 2014, which claims priority to U.S. Application No. 61/844,121, filed Jul. 9, 2013, which are all hereby incorporated by reference.

TECHNICAL FIELD

The present disclosure relates to telecommunication systems, such as cellular communication networks, and in particular relates to a method and apparatus in a telecommunication system that increases the success rate of a mobile terminated transaction.

BACKGROUND

Communication using cellular networks has traditionally been used for mobile phone applications for voice communication, and more recently applications that allow smartphones, tablets, computers and the like to handle data communications, such as Internet browsing and so forth.

A currently popular vision of the future development of communication using cellular networks is the possibility of having huge numbers of small autonomous devices which typically transmit and receive only small amounts of data infrequently (for example once per week to once per minute), or which are polled for data. These devices are assumed not to be associated with humans, but are rather sensors or actuators of different kinds, which communicate with application servers that configure the devices and receive data from them, within or outside the cellular network. Hence, this type of communication is often referred to as machine-to-machine (M2M) communication, and the devices may be denoted machine devices (MDs). In the Third Generation Partnership Project (3GPP) standardization, the corresponding alternative terms are machine type communication (MTC) and machine type communication devices (MTC devices), with the latter being a subset of the more general term user equipment (UE).

Due to the nature of MTC devices and their assumed typical applications, it follows that they will often have to be very energy efficient, since external power supplies will often not be available, and since it is neither practically nor economically feasible to frequently replace or recharge their batteries. In some scenarios the MTC devices may not even be battery powered, but may instead rely on energy harvesting, i.e. gathering energy from the environment, opportunistically utilizing (the often very limited) energy that may be tapped from sunlight, temperature gradients, vibrations, and so on.

For such energy deprived devices whose traffic is characterized by small and infrequent transactions (often delay tolerant), it is important to minimize their energy consumption.

During the time periods between communication events the devices consume energy, for example by keeping the radio receiver active to monitor transmissions from the cellular network. Since the periods between the communication events are far longer than the actual communication events, this energy consumption represents a significant part of the overall energy consumption, and may even dominate the energy consumption in scenarios where the communication events are very infrequent.

During the communication events the actual uplink (UL) transmissions naturally consume significant amounts of energy. This is magnified by the large control signalling overhead that may be associated with a communication event.

A mechanism that has been introduced in cellular networks in order to save energy in user equipment devices, for example between communication events, is the discontinuous reception (DRX) mode of operation. The discontinuous reception mode allows a user equipment device to remain in an energy-saving sleep state most of the time, while waking up to listen for pages in idle mode DRX, or downlink resource assignments (i.e. downlink transmissions) in connected mode DRX. Idle mode DRX is valid when the UE does not have a radio resource control (RRC) connection with the radio access network (RAN), e.g. an eNB, which means that the UE needs to be paged for mobile terminating traffic. Connected mode DRX is applicable when the UE has an RRC connection. In the latter case the UE can start transmitting and receiving data quicker.

Furthermore, in order to make the DRX mechanism even more effective for energy deprived MTC devices, 3GPP is working on extending the maximum DRX cycle length, and thus the sleep period, both for idle mode DRX and connected mode DRX. Therefore, a DRX cycle essentially consists of a sleep period followed by an active period and this cycle is repeated over and over again until the device is detached from the network. Typically, but not necessarily, the sleep period is longer than the active period. A DRX cycle may have a more complex structure than described above, but for the purpose of this disclosure, the simplified DRX cycle description suffices.

The idle mode DRX cycle, i.e. the paging cycle, is configured in the user equipment device through parameters in the system information (SI) that is broadcast in each cell, in conjunction with UE specific parameters in the form of IMSI MOD 1024 (where IMSI is the International Mobile Subscriber Identity) and an optional UE specific DRX cycle length. Alternatively, it is also possible to configure a UE specific paging cycle (i.e. DRX in idle mode). The connected mode DRX cycle and other DRX parameters (when used) are configured in the UE through optional parameters typically in a RRCConnectionReconfiguration message (where RRC represents Radio Resource Control), during the idle to connected mode transition or later during the connected mode.

SUMMARY

This present disclosure increases the success rate that a mobile terminated transaction is successfully concluded and increases efficiency as it decreases signalling.

3GPP works on enhancements for Machine Type Communication, MTC, which among others address the key issue "UE Power Consumption Optimizations".

Some MTC applications will predominantly trigger mobile originated transactions, i.e. communications initiated by the user equipment, UE. An example of such communication is the transmission of status reports, e.g. from meters, sensors etc. The frequency of such transactions will be rather low. Furthermore, mobile terminated communication, i.e. communication initiated by the network, will be delay tolerant, e.g. a response to a network triggered/mobile terminated communication attempt may be delayed.

The network, e.g. network nodes in the core network such as the mobility management entity (MME) or the serving GPRS (general packet radio service) support node (SGSN), may store information about the network attempts to communicate with a UE at an occasion where the UE was not accessible. Once the UE communicates with the network on some later occasion, e.g. when performing a registration (Tracking Area Update etc.), the network (e.g. the MME or SGSN) triggers signalling procedures in the network which will result in a mobile terminated, MT, communication on behalf of the earlier unsuccessful attempt, e.g. MT SMS (mobile terminated short message service).

The signalling procedure in the network required to trigger a mobile terminated communication, however, might consume some time. Accordingly, there is a possibility that by the time the network has initiated the MT communication, the connection between the UE and the network has already been released in the meantime. This would especially be a risk if the UE is given longer DRX values to optimize the power consumption of the UE, but this can also be a risk if the network has configured the RRC (radio resource control) inactivity timer to be rather short (which is a normal way today to save eNodeB (eNB) memory).

According to certain aspects, the present disclosure introduces means to notify the Radio Access Network, RAN, (e.g. eNB) that mobile terminated data is pending for a UE. The RAN can use this notification to avoid a premature release of the connection to the UE (release of the UE contexts in the RAN and the core network as well as the release of the RRC connection).

Thereby a more efficient MT communication is enabled.

According to a specific aspect, there is provided a method in a network node of a radio access network, RAN, in a telecommunication system, the method comprising receiving an indication from a network node in a core network that mobile terminated data is pending for a user equipment, UE, receiving a connection request from the UE and setting up a radio resource control, RRC, connection to the UE, releasing the RRC connection to the UE, whereby the method further comprises setting a release timer value to a value sufficient to establish a mobile terminated communication by the network to the UE and the step of releasing the RRC connection to the UE is performed when the release timer has expired.

In some embodiments the network node of the RAN is an eNodeB, a radio network controller, RNC, a NodeB, a base station controller, BSC, or a base transceiver station, BTS. In some embodiments the network node in the core network is a mobile switching center, MSC, a serving general packet radio service, GPRS, support node, SGSN, or a mobility management entity, MME.

In some embodiments the indication received from the network node in the core network indicate that a UE Reachability Request Parameter for a Mobility Management Entity, URRP-MME, flag or a UE Reachability Request Parameter for a serving general packet radio service, GPRS, support node, URRP-SGSN, flag is set in the network node of the core network.

In alternative embodiments the step of receiving an indication from a network node in a core network comprises the step of receiving a message from the network node in the core network, the message comprising an information element, IE, indicating that mobile terminated data is pending for the UE.

In some embodiments the release timer value is set to a larger value than an RRC inactivity timer.

In certain embodiments the network node of the RAN is an eNodeB and the network node in the core network is a mobility management entity, MME, and wherein the indication from a network node in a core network that mobile terminated data is pending for a UE comprises an indication that the eNodeB should not release the RRC connection immediately on expiry of an RRC release timer.

In alternative embodiments the indication from a network node in a core network that mobile terminated data is pending for a UE may be received while the network node has an RRC connection to the UE.

In some embodiments the network node of the RAN is an eNodeB and the network node in the core network is a mobility management entity, MME, and the step of receiving an indication from a network node in a core network that mobile terminated data is pending for a UE comprises receiving an S1 UE Context Release Command (Cause) message with a cause value indicating that a downlink or mobile terminated transaction is pending.

According to a further aspect, there is provided a network node for use in a radio access network, RAN, of a telecommunication system, the network node comprising a receiver adapted to receive an indication from a network node in a core network that mobile terminated data is pending for a user equipment, UE, and receive a connection request from the UE, and circuitry adapted to set up a radio resource control, RRC, connection to the UE and release the RRC connection to the UE, whereby the circuitry adapted to set up and release the RRC connection to the UE is configured to set a release timer value to a value sufficient to establish a mobile terminated communication by the network to the UE and to release the RRC connection to the UE after the release timer has expired.

In some embodiments the network node of the RAN is an eNodeB, a radio network controller, RNC, a NodeB, a base station controller, BSC, or a base transceiver station, BTS. In some embodiments the network node in the core network is a mobile switching center, MSC, a serving general packet radio service, GPRS, support node, SGSN, or a mobility management entity, MME.

In some embodiments the indication received from the network node in the core network indicates that a UE Reachability Request Parameter for a Mobility Management Entity, URRP-MME, flag or a UE Reachability Request Parameter for a serving general packet radio service, GPRS, support node, URRP-SGSN, flag is set in the network node of the core network.

In alternative embodiments the indication from a network node in the core network that the receiver is adapted to receive is a message from the network node in the core network, the message comprising an information element, IE, indicating that mobile terminated data is pending for the UE.

In some embodiments the circuitry is configured to set the release timer value to a larger value than an RRC inactivity timer.

In some embodiments the network node of the RAN is an eNodeB and the network node in the core network is a mobility management entity, MME, and wherein the indication from a network node in a core network that mobile terminated data is pending for a UE that the receiver is adapted to receive comprises an indication that the eNodeB should not release the RRC connection immediately on expiry of an RRC release timer.

In alternative embodiments the indication from a network node in a core network that mobile terminated data is pending for a UE that the receiver is adapted to receive may be received while the network node has an RRC connection to the UE.

In some embodiments the network node of the RAN is an eNodeB and the network node in the core network is a mobility management entity, MME, and the indication from a network node in a core network that mobile terminated data is pending for a UE that the receiver is adapted to receive comprises an S1 UE Context Release Command (Cause) message with a cause value indicating that a downlink or mobile terminated transaction is pending.

According to yet another aspect, there is provided a method in a network node of a core network in a telecommunication system, the method comprising the step of sending an indication to a network node in a radio access network, RAN, that mobile terminated data is pending for a user equipment, UE, to avoid a premature release of a connection to a UE.

In some embodiments the indication is to avoid a premature release of UE contexts in the RAN and the core network and the release of a radio resource control, RRC, connection.

In some embodiments the network node of the RAN is an eNodeB, a radio network controller, RNC, a NodeB, a base station controller, BSC, or a base transceiver station, BTS. In some embodiments the network node in the core network is a mobile switching center, MSC, a serving general packet radio service, GPRS, support node, SGSN, or a mobility management entity, MME.

In some embodiments the indication sent to the network node in the RAN is indicating that a UE Reachability Request Parameter for a Mobility Management Entity, URRP-MME, flag or a UE Reachability Request Parameter for a serving general packet radio service, GPRS, support node, URRP-SGSN, flag is set in the network node of the core network.

In alternative embodiments the step of sending an indication to a network node in a RAN comprises the step of sending a message, the message comprising an information element, IE, indicating that mobile terminated data is pending for the UE.

In some embodiments the network node of the RAN is an eNodeB and the network node in the core network is a mobility management entity, MME, and wherein the indication sent to the network node in the RAN that mobile terminated data is pending for a UE comprises an indication that the eNodeB should not release the RRC connection immediately on expiry of an RRC release timer.

In some embodiments the network node of the RAN is an eNodeB and the network node in the core network is a mobility management entity, MME, and the step of sending an indication to a network node in a RAN that mobile terminated data is pending for a UE comprises sending an S1 UE Context Release Command (Cause) message with a cause value indicating that a downlink or mobile terminated transaction is pending.

In some embodiments the network node of the RAN is an eNodeB and the network node in the core network is a mobility management entity, MME, and the method further comprises the step of determining if a UE Reachability Request Parameter, URRP, flag is set, and wherein the step of sending an indication is performed if the URRP flag is set.

According to a further aspect, there is provided a network node for use in a core network in a telecommunication system, the network node being adapted to send an indication to a network node in a radio access network, RAN, that mobile terminated data is pending for a user equipment, UE, to avoid a premature release of a connection to a UE.

In some embodiments the indication is to avoid a premature release of UE contexts in the RAN and the core network and the release of a radio resource control, RRC, connection.

In some embodiments the network node of the RAN is an eNodeB, a radio network controller, RNC, a NodeB, a base station controller, BSC, or a base transceiver station, BTS. In some embodiments the network node in the core network is a mobile switching center, MSC, a serving general packet radio service, GPRS, support node, SGSN, or a mobility management entity, MME.

In some embodiments the network node is adapted to send an indication to the network node in the RAN indicating that a UE Reachability Request Parameter for a Mobility Management Entity, URRP-MME, flag or a UE Reachability Request Parameter for a serving general packet radio service, GPRS, support node, URRP-SGSN, flag is set in the network node of the core network.

In some embodiments the network node is adapted to send an indication to a network node in a RAN that comprises a message, the message comprising an information element, IE, indicating that mobile terminated data is pending for the UE.

In some embodiments the network node of the RAN is an eNodeB and the network node in the core network is a mobility management entity, MME, and wherein the network node is adapted to send an indication that comprises an indication that the eNodeB should not release the RRC connection immediately on expiry of an RRC release timer.

In some embodiments the network node of the RAN is an eNodeB and the network node in the core network is a mobility management entity, MME, and the network node is adapted to send an indication that comprises an S1 UE Context Release Command (Cause) message with a cause value indicating that a downlink or mobile terminated transaction is pending.

In some embodiments the network node of the RAN is an eNodeB and the network node in the core network is a mobility management entity, MME, wherein the network node is adapted to determine if a UE Reachability Request Parameter, URRP, flag is set, and to send the indication if the URRP flag is set.

According to another aspect there is provided a method in a network node of a RAN in a telecommunication system, the method comprising keeping a user equipment, UE, that is configured for long discontinuous reception, DRX, in idle mode, in radio resource control, RRC, connected mode long enough to allow a network stored mobile terminated short message service, MT SMS, to be received by the UE.

In some embodiments the network node of the RAN is an eNodeB.

In some embodiments the step of keeping a UE in RRC connected mode long enough to allow a network stored MT SMS to be received by the UE is performed if the eNodeB receives an indication from a mobility management entity, MME.

In some embodiments the indication is received via an S1 interface.

According to another aspect there is provided a network node for use in a RAN in a telecommunication system, the network node being adapted to keep a user equipment, UE, that is configured for long discontinuous reception, DRX, in idle mode, in radio resource control, RRC, connected mode long enough to allow a network stored mobile terminated short message service, MT SMS, to be received by the UE.

In some embodiments the network node of the RAN is an eNodeB.

In some embodiments the network node is adapted to keep a UE in RRC connected mode long enough to allow a network stored MT SMS to be received by the UE if the eNodeB receives an indication from a mobility management entity, MME.

In some embodiments the network node is adapted to receive the indication via an S1 interface.

In a further aspect there is provided a method of operating a network node in a core network of a telecommunication system, the method comprising providing an indication to an eNodeB that the eNodeB should keep a user equipment, UE, that is configured for long discontinuous reception, DRX, in idle mode, long enough in radio resource control, RRC, connected mode to allow a network stored mobile terminated short message service, MT SMS, to be received by the UE.

In some embodiments the step of providing an indication is performed if a UE Reachability Request Parameter, URRP, flag is set.

In some embodiments the indication is provided via an S1 interface.

In some embodiments the network node in a core network is a mobility management entity, MME.

According to a further aspect, there is provided a network node for use in a core network in a telecommunication system, the network node being adapted to provide an indication to an eNodeB that the eNodeB should keep a user equipment, UE, that is configured for long discontinuous reception, DRX, in idle mode, long enough in radio resource control, RRC, connected mode to allow a network stored mobile terminated short message service, MT SMS, to be received by the UE.

In some embodiments the network node is adapted to provide the indication when a UE Reachability Request Parameter, URRP, flag is set.

In some embodiments the indication is provided via an S1 interface.

In some embodiments the network node in a core network is a mobility management entity, MME.

According to another aspect there is provided a computer program product having computer-readable instructions stored on a computer-readable medium, the computer-readable instructions being configured such that, on execution by a suitable computer or processing circuitry, the computer or processing circuitry performs any of the methods in the network node of the core network described above.

According to another aspect there is provided a computer program product having computer-readable instructions stored on a computer-readable medium, the computer-readable instructions being configured such that, on execution by a suitable computer or processing circuitry, the computer or processing circuitry performs any of the methods in the network node of the radio access network described above.

Another aspect provides a network node for use in a radio access network, RAN, of a telecommunication system, the network node comprising a processor and a memory, said memory containing instructions executable by said processor whereby said network node is operative to perform any of the methods in the network node of the radio access network described above.

Another aspect provides a network node for use in a core network of a telecommunication system, the network node comprising a processor and a memory, said memory containing instructions executable by said processor whereby said network node is operative to perform any of the methods in the network node of the core network described above.

BRIEF DESCRIPTION OF THE DRAWINGS

Exemplary embodiments of the invention will now be described, by way of example only, with reference to the following drawings, in which:

FIGS. 2 and 3 show the network initiated SM and MM messages for NAS;

DETAILED DESCRIPTION

Figure 1:
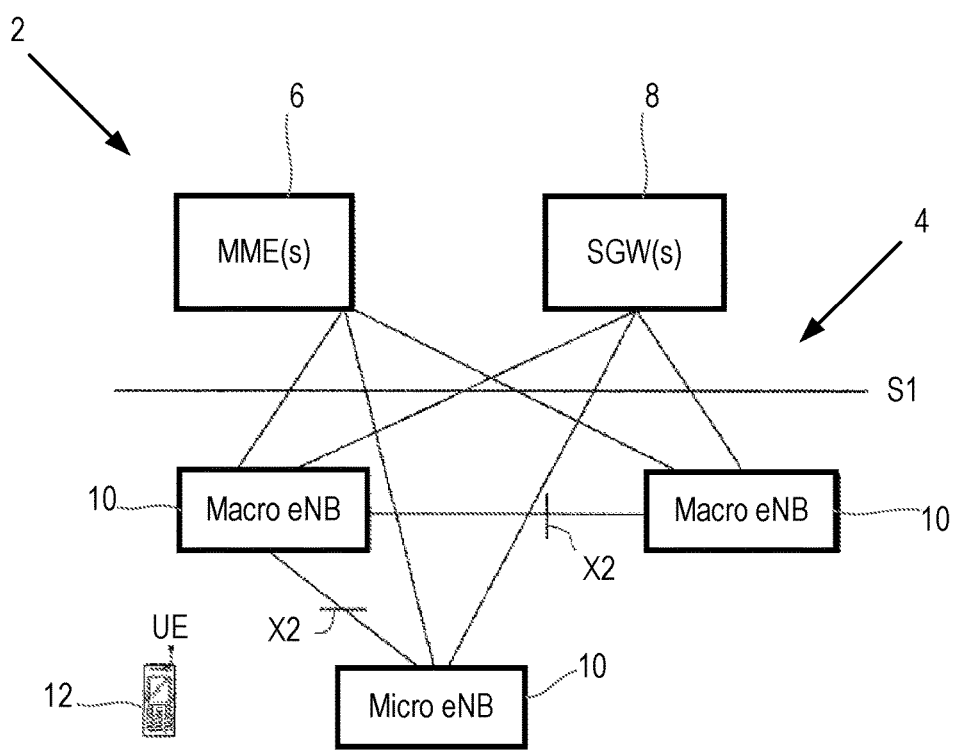
FIG. 1 is a is a non-limiting example block diagram of an LTE cellular communication network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the term "mobile device" is used in the following description, and it will be appreciated that such a device or a UE, particularly a MTC device, does not necessarily have to be 'mobile' or associated with a 'user' in the sense that it is carried by a user. Instead, the terms "mobile device" and "UE" encompass any device that is capable of communicating with communication networks that operate according to one or more mobile communication standards, such as Global System for Mobile (GSM) communications, Universal Mobile Telecommunications System (UMTS), Long Term Evolution (LTE), etc.

A cell is associated with a base station, where a base station comprises in a general sense any node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), base transceiver station (BTS), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node of a RAN" as used herein can refer to a base station, such as an eNodeB, a NodeB, a base transceiver station (BTS), a network node in the RAN responsible for resource management, such as a radio network controller (RNC) or a base station controller (BSC). The term "network node in a core network" as used herein or core network node can refer to a mobile switching center (MSC), an SGSN, a Serving Gateway (SGW) or a mobility management entity (MME).

It should also be noted that although the following description concerns an LTE based communication system, the method and apparatus described herein are not limited to use in such a system and they can be used in other types of communication system such as GSM, UMTS, etc.

The signalling described is either via direct links or logical links (e.g. via higher layer protocols and/or via one or more network nodes). For example, signalling from a coordinating node may pass another network node, e.g., a radio node.

FIG. 1 shows an example diagram of an Evolved-UMTS Terrestrial Radio Access Network (E-UTRAN) architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 referred to in LTE as eNBs, over an interface, for example an S1 interface. The eNBs 10 can include the same or different categories of eNBs, e.g. macro eNBs, and/or micro/ pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12.

The discussion below proposes some resolution to re-transmission timer aspects on higher layers when using long DRX cycles in idle mode and describes SGW logic handling MT IP data.

It is expected that from a UE power optimization perspective the timer would preferably be selected to a larger value than re-transmission timers on e.g. NAS [network access stratum] and higher layers such as TCP [transmission control protocol] and application specific timers.

For NAS, the network initiated SM and MM messages are shown in FIGS. 2 and 3. It seems that all messages except the paging procedure would normally be initiated after UE has been sending some message in the UL. It is reasonable to assume that for all normal scenarios the network initiated NAS message would be sent while the UE is in connected mode and there is no need to adapt any re-transmission timer for NAS messages except for the paging which is already mentioned.

For transport protocols like TCP a long delay will cause re-transmissions, i.e. for UEs which are given a long delay for the initial DL [downlink] transmission it should be recommended to make use of IP/UDP [internet protocol/user datagram protocol] with an adapted application.

To avoid SMS layer to perform re-transmissions the CN sets the unreachable flag and the next time the UE becomes available a normal DRX cycle value is given to allow the MT SMS to reach the UE without re-transmissions at SMS layer.

The description of the solution to efficient MT communication presented in this disclosure is based on the content of section 7.1.3 of 3GPP TR 23.887 v1.0.0 (2013 June) which addresses the key issue "UE Power Consumption Optimizations". The content of sections 7.1.3.1.1 and 7.1.3.1.2 of TR 23.887 v1.0.0 (2013 June) is reproduced almost in their entirety below, but with additions relating to the solution to efficient MT communication.

The characteristics of the solution is that the Maximum DRX cycles in idle mode are possibly extended with longer values allowing the UE to save battery as waking up and listening for a potential paging message is one major power consuming functionality. When this solution is used, paging transmission period is also adjusted based on the extended DRX cycle applied to the UE.

Extended DRX cycles are enabled in UTRAN/E-UTRAN by providing the parameters for extended DRX in NAS [Non-Access Stratum]. The current DRX parameters from UE to network in TS 24.008 v12.2.0 10.5.5.6 are extended in a backward compatible way to ensure that normal UE(s), i.e. UEs not requiring low power consumption, are not impacted. For enabling the extended DRX cycle in UTRAN/ E-UTRAN, UE and network should exchange their support for the extended DRX (either by an explicit capability indication or implicitly when requesting the extended DRX cycle value). In this procedure, the availability of extended DRX for the UE should be decided in consideration of the UE's capability, the network condition (e.g., ISR [idle mode signal reduction] activation), as well as the support of extended DRX of the RAN nodes within an area served by the core network node (e.g., TAs [tracking areas] or MME pool area). This is because the UE can travel through several RAN nodes without performing location update, even when some part of RAN nodes do not support the extended DRX (e.g., legacy E-UTRAN nodes in TA or legacy UTRAN nodes in the ISR activated case). The support of extended DRX of the RAN nodes could be informed to the MME by using S1/Iu signalling, OA&M [operations, administration and management] method, or manual configuration. If supported, the UE can request the configuration use of the extended DRX cycle at any time, by using a NAS procedure.

If the DRX cycles are to be extended longer than the System Frame Number [SFN] currently allows then there might be a need to extend the time allowed by the SFN.

For E-UTRAN, the MME needs to indicate eNB to adopt the UE specific DRX value in the paging message rather than the shortest one of the UE specific DRX value and a default DRX value broadcast in system information. After UE reports the extended DRX value in the NAS, the UE also ignores the default value broadcasted in the system information and adopt the reported one.

In GERAN [GSM EDGE (Enhanced Data Rates for GSM Evolution) RAN] longer paging transmission periods are enabled by in extending the parameter "BS-PA-MFRMS" (see 3GPP TS 44.018 v11.5.0 chapter 10.5.2.11). The extension could be done e.g. by multiplying the BS-PA-MFRMS parameter with a given value used as a paging multiplier factor. This factor should then be communicated between UE and CN [core network] and then from CN to GERAN e.g. by adding the multiplier factor to the paging message.

Paging timers and paging repetition in MSC/SGSN/MME are accommodated to cater for the extended DRX cycle.

In addition, network could notify that the UE should alternate the extended DRX cycle (value specified in the NAS parameter for extended DRX) with one or several normal DRX cycle(s) (value of the DRX parameter multiplied by "1"). Such notification could be sent to the UE in a NAS message e.g. the Attach Accept/TAU [tracking area update] Accept.

The need for alternating the DRX cycle would limit the risk of a UE missing a paging due to the DRX cycle been extended to a long value.

Paging re-transmission timers in the MSC/SGSN/MME should be adapted to fit in the needs of the extended DRX cycle and normal DRX cycle.

The used DRX value needs to be known by the UE, RAN and the core network, e.g. the MME/SGSN.

It should be evaluated how the UE wakes up from extended DRX cycle and ensure that paging loss is minimized.

Considering that the CN may be impacted it is reasonable that CN should be able to override UE provided DRX values that are longer then currently supported values.

The decision for UE initiating low power consumption mode may be based on the UE configuration by the network or UE implementation.

Without adjusting the re-transmission timers on higher layers, longer DRX cycle maximum up to several minutes may impact the reachability of the UE that would bring unnecessary overhead to the network, e.g., paging and GTP [GPRS tunneling protocol] message retransmission, abnormal case handling without the feedback response in the expected time duration.

Limitations might be introduced on which maximum/reasonable DRX value that it should be possible to select.

When a long DRX cycle is used, then re-transmission on higher layers needs to be considered and minimized. Normally network initiated NAS messages are sent while UE is in connected mode and therefore there is for the far most cases no need to adapt any NAS re-transmission timers in the CN (except for paging repetition). However, in case there is a need to page the UE to initiate a NAS procedure e.g. GUTI [Globally Unique Temporary Identity] or PTMSI [Packet Temporary Mobile Subscriber Identity] Re-allocation then the NAS retransmission timers for network initiated (E)MM [Evolved Packet System (EPS) mobility management] procedures and (E)SM [EPS session management] procedures are adjusted based on DRX value for values larger than the currently defined value in TS 24.008 v. 12.2.0 and 24.301 v. 12.1.0.

The adjustment should be performed for each NAS retransmission timer value as:
   If DRX value is larger than default value, then the NAS retransmission timer value is adjusted to X times the DRX value.

To be able to handle DL UP (user plane) data, it is also recommended to make use of an adapted application which is able to handle high latency communication and to use IP/UDP [internet protocol/user datagram protocol] instead of TCP [transmission control protocol].

For MT SMS, to avoid control protocol (CP)-layer re-transmissions of CP-DATA, the RAN either keeps UEs (configured for using long DRX in idle) in RRC connected slightly longer to allow the MT SMS. Put another way, for MT SMS, to avoid CP-layer re-transmissions of CP-DATA, the RAN could keep UEs configured for using long DRX in idle mode in RRC connected mode long enough to allow a network stored MT SMS to be received by the UE. As an optimization, when the URRP [UE Reachability Request Parameter] flag is set the MME could provide an indication to the eNB (via S1) that the eNB should keep the UE long enough in RRC connected mode to allow a network stored MT SMS to be received by the UE.

Impacts on SGSN/MME/MSC:
   Support NAS-protocol extensions to enable extended DRX cycles. Support for coding of parameters for the extended DRX and sending it in a dedicated NAS message to the UE.
   Paging re-transmission timer in the MSC/SGSN/MME should be adapted to fit in the needs of the extended DRX cycle and normal DRX cycle.
   Support notifying the UE that it should alternate the extended DRX cycle with 1 or more normal DRX cycles.
   The SGW buffer size is not proposed to be impacted, i.e. additional DL packets beyond the buffer size would be dropped. Though, it should not be any problem as it is not expected that large number of DL packets would be received without any UL packets sent from the UE as long as the DRX value is set to a value which limits any re-transmissions from higher layers. In addition, the SGW keep a DL packet until the user plane bearer has been established or until the MME has replied to the Downlink Data Notification message with a Downlink Data Notification Reject.
   For MT SMS, the CN sets the URRP-SGSN [UE Reachability Request Parameter for SGSN] or URRP-MME [UE Reachability Request Parameter for MME] flag and when the UE becomes available the CN sets the DRX cycle to a normal value to allow the UE being paged for MT-SMS.
   For MT SMS, when the URRP flag is set the CN potentially provides an indication to the RAN that the RAN should keep the UE slightly longer in RRC connected mode.
   E.g. if the MME is requested to notify the HSS [home subscriber server] when the UE becomes reachable, the MME shall set the URRP-MME parameter to indicate the need to inform the HSS about UE reachability, e.g. when the next NAS activity from the UE is detected. If the SGSN is requested to notify the HSS when the UE becomes reachable, the SGSN shall set the URRP-SGSN parameter to indicate the need to inform the HSS about UE reachability, e.g. when the next NAS activity from the UE is detected.

Impacts on UE:
Support RAT-protocol extensions to enable negotiation of extended DRX cycles
Support NAS-protocol extensions to enable extended DRX cycles. Support for coding of parameters for the extended DRX and sending it in a dedicated NAS message to the UE.
Support alternating the extended DRX cycle with the normal DRX cycles.

Impacts on E-UTRAN/UTRAN:
Support RAT-protocol extensions to enable negotiation of extended DRX cycles
Modified handling of paging requests to accommodate the extended DRX cycle along with the normal DRX cycle. Also it may need to contain expanded buffers in order to buffer the paging requests received from the core network during the extended DRX cycle period.
May need to indicate its support for extended DRX to the core network nodes.
Keeps UEs configured for using long DRX in idle mode in RRC connected mode long enough to allow a network stored MT SMS (potentially dependent on CN indication) to be received by the UE.

Impacts on GERAN:
Support GERAN protocol extensions to enable negotiation of extended paging cycles.

There are achievable gains in energy and power consumption by using longer DRX cycles in idle mode. Using cycles of maximum up to several minutes would however require applications that can tolerate this.

The idle mode long DRX is more suitable to infrequent data transmission where the UE needs to be reachable for downlink initiated transactions like signalling or data transfers.

Overall gains are more achievable for the device with stationary or low mobility considering the trade-off between the power consumption and Mobility performance degradation.

The maximum value setting for DRX needs to consider the impacts on 3GPP and user/application protocols.

As noted above, the present disclosure proposes a new method to improve the reachability and thus successful MT communication with a solution that has low impact.

Figure 4:
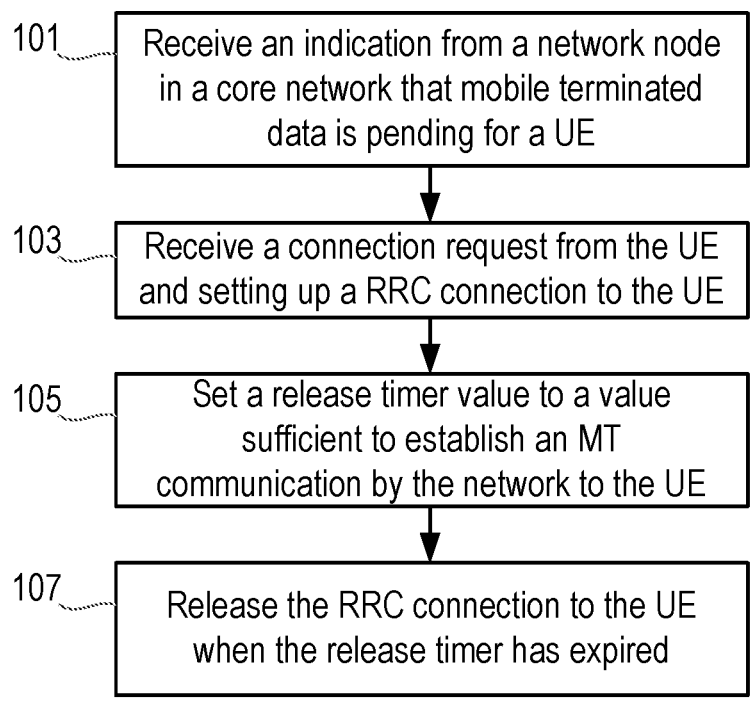
FIG. 4 is a flow chart illustrating a method in a network node in a RAN.

In particular, a method in a network node 10 of a RAN in a telecommunication system 2 is described below and illustrated in FIG. 4. The method comprises
a) Receiving an indication from a network node 6, 8 in a core network that mobile terminated data is pending for a UE 12 (step 101),
b) Receiving a connection request from the UE 12 and setting up a RRC connection to the UE 12 (step 103),
c) Releasing the RRC connection to the UE 12 (step 107), whereby the method further comprises setting a release timer value to a value sufficient to establish a mobile terminated communication by the network to the UE 12 (step 105) and the step of releasing the RRC connection to the UE (step 107) is performed when the release timer has expired.

Step a) (step 101) may be performed before or after step b) (step 103) has been performed, i.e. the indication may be received while the UE 12 has an RRC connection or before the UE 12 establishes an RRC connection.

Figure 5:
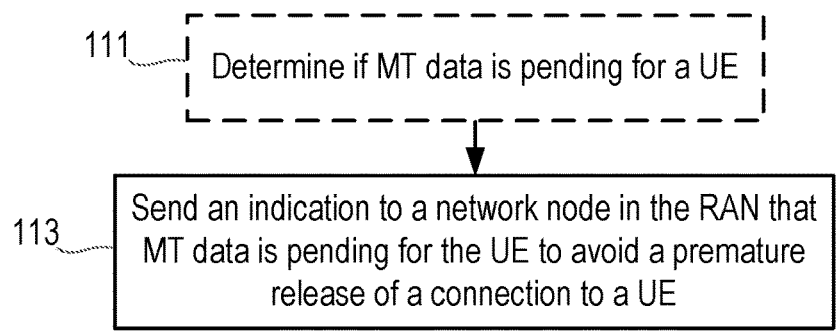
FIG. 5 is a flow chart illustrating a method in a network node in a core network.

A corresponding method in a network node 6, 8 of a core network in a telecommunication system is described below and illustrated in FIG. 5. The method comprises sending an indication to a network node 10 in the RAN that MT data is pending for the UE 12 (step 113). This indication is sent to the network node 10 in the RAN to avoid a premature release of a connection to the UE 12, and so allow the MT data to be sent to the UE 12.

Preferably, prior to the step of sending (step 113), the method also comprises a step of determining if MT data is pending for a UE 12 (step 111), and step 113 is performed if there is MT data pending for a UE 12.

The indication in step 113 is preferably to avoid a premature release of UE contexts in the RAN and the core network and the release of an RRC connection.

The network node 10 of the RAN can be an eNodeB, an RNC, a NodeB, a BSC, or a BTS. The network node 6, 8 in the core network can be an MSC, an SGSN, or an MME.

Preferably, the indication received in step 101 from the network node 6, 8 in the core network (and sent from the core network node 6, 8 in step 113) indicates that a UE Reachability Request Parameter for a MME (URRP-MME) flag or a URRP-SGSN flag is set in the network node 6, 8 of the core network.

In some embodiments, steps 101 and 113 can comprise respectively receiving and sending a message that comprises an information element, IE, indicating that mobile terminated data is pending for the UE 12.

Where the network node of the RAN is an eNodeB 10 and the network node in the core network is an MME 6, the step of receiving 101 and sending 113 an indication can comprise respectively receiving and sending an S1 UE Context Release Command (Cause) message with a cause value indicating that a downlink or mobile terminated transaction is pending.

When the URRP flag is set the MME could provide an indication to the eNB (via S1) that the eNB should keep the UE slightly longer in RRC connected, e.g. upon expiration of an RRC release timer the RRC connection should not be released immediately. This might be accomplished by setting a release timer value to a value sufficient to establish a mobile terminated communication by the network to the UE. The release timer may have a larger value than the RRC inactivity timer to ensure that the mobile terminated communication can be established by the network if mobile terminated data is pending for the UE. This will then be an explicit indication that will ensure that the MT communication will be successfully conducted.

If the above solution is applied to UTRAN, the indication from the core network node (SGSN/MSC) would be transmitted over the Iu interface to the network node in the RAN (base station). If the above solution is applied to GERAN, the indication from the core network node would be transmitted over the Gb interface to the network node in the RAN.

The main simplification of the solution presented above is that only a single network-network interface is affected and that given the solution's nature the risk of having incorrect parameters being used is ruled out.

The procedures and embodiments are described above in the context of LTE by way of example only, and can be similarly implemented for other technologies, such as wideband code division multiple access (WCDMA) or GSM.

Figure 6:
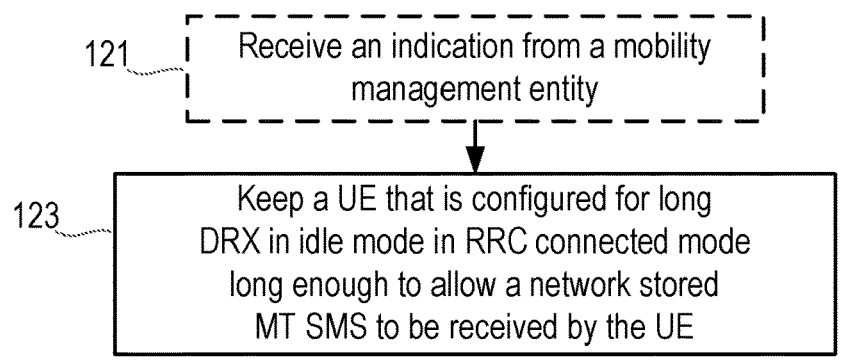
FIG. 6 is a flow chart illustrating a general method in a network node in a RAN.
Figure 7:
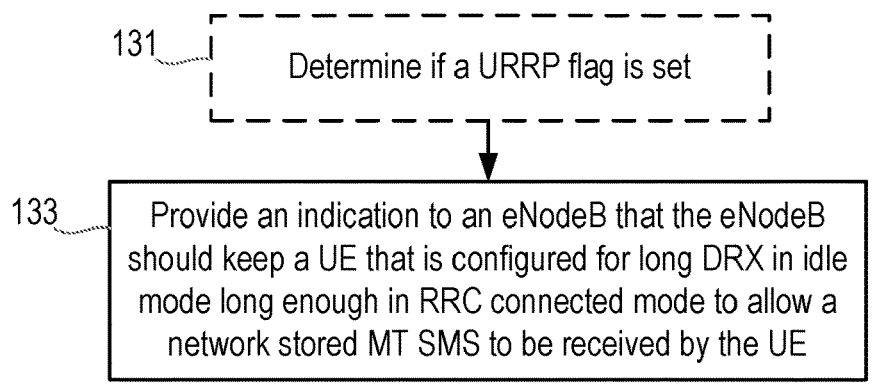
FIG. 7 is a flow chart illustrating a general method in a network node in a core network.

General methods of operating a network node in a RAN and a network node in a core network are illustrated in FIGS. 6 and 7 respectively.

In a network node 10 of a RAN (such as an eNodeB) in a telecommunication system, the method comprises the network node 10 keeping a UE 12 that is configured for long discontinuous reception, DRX, in idle mode, in RRC connected mode long enough to allow a network stored mobile terminated short message service, MT SMS, to be received by the UE (step 123).

Optionally, prior to step 123, in step 121, the network node of a RAN receives an indication from a mobility management entity (MME) 6 that triggers the network node to perform step 121. This indication can be received via an S1 interface between the network node 10 in the RAN and the MME 6.

In FIG. 7, which illustrates a method of operating a network node 6, 8 in a core network of a telecommunication system, the method comprises providing an indication to an eNodeB 10 that the eNodeB 10 should keep a UE 12 that is configured for long DRX in idle mode long enough in RRC connected mode to allow a network stored MT SMS to be received by the UE (step 133).

Optionally, prior to step 133, the method further comprises the step of determining if a UE Reachability Request Parameter, URRP, flag is set (step 131), and the step of providing an indication (step 133) is performed if the flag is set.

The network node 6 in the core network is preferably an MME 6 and the indication provided in step 133 is provided via an S1 interface.

Figure 8:
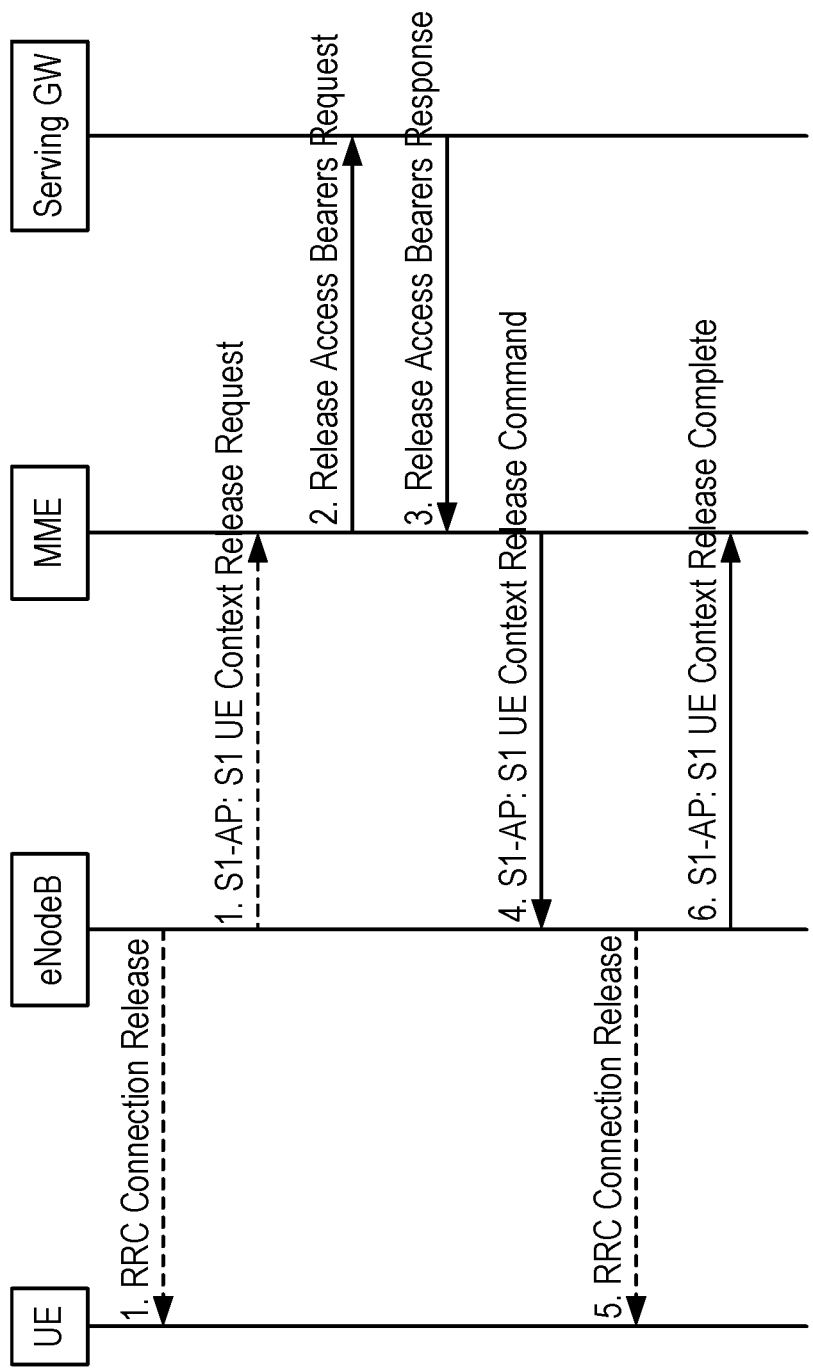
FIG. 8 is a signalling diagram illustrating an S1 Release procedure.

FIG. 8 illustrates the S1 release procedure that releases the connection between the UE and the network. This Figure and much of the following description is based on section 5.3.5 of 3GPP TS 23.401 v12.1.0 (2013 June). To avoid premature release and if the MME is aware of pending downlink/MT transaction, a new procedure or enhancement as described below can be used.

1a. In certain cases, the eNodeB may release the UE's signalling connection before or in parallel to requesting the MME to release the S1 context, e.g. the eNodeB initiates an RRC Connection Release for CS Fallback by redirection.

1b. If the eNodeB detects a need to release the UE's signalling connection and all radio bearers for the UE, the eNodeB sends an S1 UE Context Release Request (Cause) message to the MME. Cause indicates the reason for the release (e.g. O&M intervention, unspecified failure, user inactivity, repeated integrity checking failure, or release due to UE generated signalling connection release).

Step 1 is only performed when the eNodeB-initiated S1 release procedure is considered. Step 1 is not performed and the procedure starts with Step 2 when the MME-initiated S1 release procedure is considered.

2. The MME sends a Release Access Bearers Request message to the S-GW that requests the release of all S1-U bearers for the UE. This message is triggered either by an S1 Release Request message from the eNodeB, or by another MME event.

3. The S-GW releases all eNodeB related information (address and TEIDs [Tunnel Endpoint Identities]) for the UE and responds with a Release Access Bearers Response message to the MME. Other elements of the UE's S-GW context are not affected. The S-GW retains the S1-U configuration that the S-GW allocated for the UE's bearers. The S-GW starts buffering downlink packets received for the UE and initiating the "Network Triggered Service Request" procedure, described in clause 5.3.4.3 of 3GPP TS 23.401 v12.1.0 (2013 June), if downlink packets arrive for the UE.

4. The MME releases S1 by sending the S1 UE Context Release Command (Cause) message to the eNodeB.

In the case that MME is aware of a pending downlink/MT transaction, i.e. URRP Flag is set (e.g. as described above in step 131), it shall indicate in the S1 UE Context Release Command (Cause) message to the eNodeB e.g. with a new cause value that a downlink/MT transaction is pending. Alternatively, a new procedure including a new message with new information elements can be used.

5. If the RRC connection is not already released, the eNodeB sends a RRC Connection Release message to the UE in Acknowledged Mode. Once the message is acknowledged by the UE, the eNodeB deletes the UE's context.

6. The eNodeB confirms the S1 Release by returning an S1 UE Context Release Complete message to the MME. With this, the signalling connection between the MME and the eNodeB for that UE is released. This step shall be performed promptly after step 4, e.g. it shall not be delayed in situations where the UE does not acknowledge the RRC Connection Release.

The MME deletes any eNodeB related information ("eNodeB Address in Use for S1-MME" and "eNB UE S1AP ID") from the UE's MME context, but, retains the rest of the UE's MME context including the S-GW's S1-U configuration information (address and TEIDs). All non-GBR [guaranteed bit rate] EPS bearers established for the UE are preserved in the MME and in the Serving GW.

If the cause of S1 release is because of User I inactivity, Inter-RAT Redirection, the MME shall preserve the GBR bearers. If the cause of S1 release is because of CS Fallback triggered, further details about bearer handling are described in 3GPP TS 23.272 v11.4.0. Otherwise, e.g. Radio Connection With UE Lost, S1 signalling connection lost, eNodeB failure the MME shall trigger the MME Initiated Dedicated Bearer Deactivation procedure (clause 5.4.4.2 of TS 23.401 v12.1.0 (2013 June)) for the GBR bearer(s) of the UE after the S1 Release procedure is completed.

It will be noted that EPC does not support the GPRS preservation feature with setting the MBR for GBR bearers to zero.

Apparatus

As noted above, although the described solutions may be implemented in any appropriate type of telecommunication system supporting any suitable communication standards and using any suitable components, particular embodiments of the described solutions may be implemented in one or more nodes of the Core Network of the LTE/EPC system specified by the 3GPP or in one or more nodes of a Radio Access Network (RAN), such as a node in an LTE network. These nodes include, but are not limited to, an eNodeB in an LTE network.

The network in which these techniques are implemented may further include any additional elements suitable to support communication between wireless devices or between a wireless device and another communication device (such as a landline telephone). Although the illustrated network nodes may represent a network communication device that includes any suitable combination of hardware and/or software, these network nodes may, in particular embodiments, represent a device such as the example network node 700 illustrated in greater detail in FIG. 9. Similarly, although the illustrated base station nodes (e.g., an eNB) may represent network nodes that include any suitable combination of hardware and/or software, these network nodes may, in particular embodiments, represent devices such as the example network node 800 illustrated in greater detail by FIG. 8.

Figure 9:
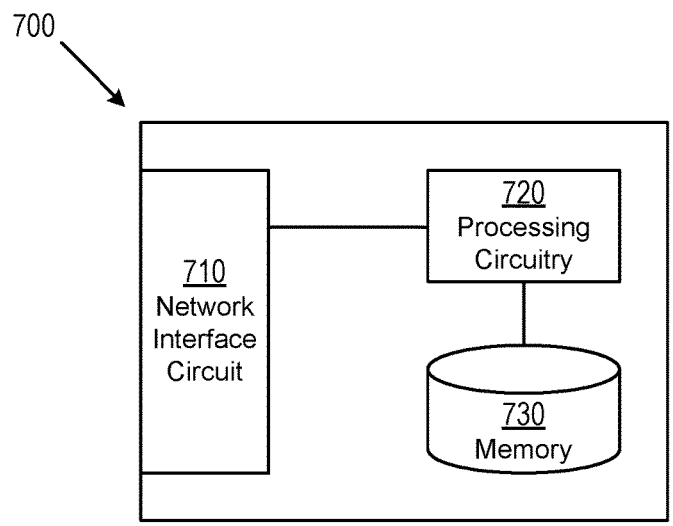
FIG. 9 is a block diagram of a network node.

As shown in FIG. 9, the example network node 700 includes processing circuitry 720, a memory 730, and network interface circuitry 710. In particular embodiments, some or all of the functionality described above as being provided by a core network node or a node in a RAN may be provided by the processing circuitry 720 executing instructions stored on a computer-readable medium, such as the memory 730 shown in FIG. 9. Alternative embodiments of the network node 700 may include additional components beyond those shown in FIG. 9 that may be responsible for providing certain aspects of the node's functionality, including any of the functionality described above and/or any functionality necessary to support the solutions described above. In particular, the network node in the RAN may comprise a receiver for receiving an indication from a network node in a core network that mobile terminated data is pending for a UE and a receiver for receiving a connection request from the UE, circuitry for setting up a RRC connection to the UE and releasing the RRC connection to the UE, whereby the circuitry for setting up and releasing the RRC connection to the UE is configured to set a release timer value to a value sufficient to establish a mobile terminated communication by the network to the UE and that the RRC connection to the UE is released after the release timer has expired.

Figure 10:
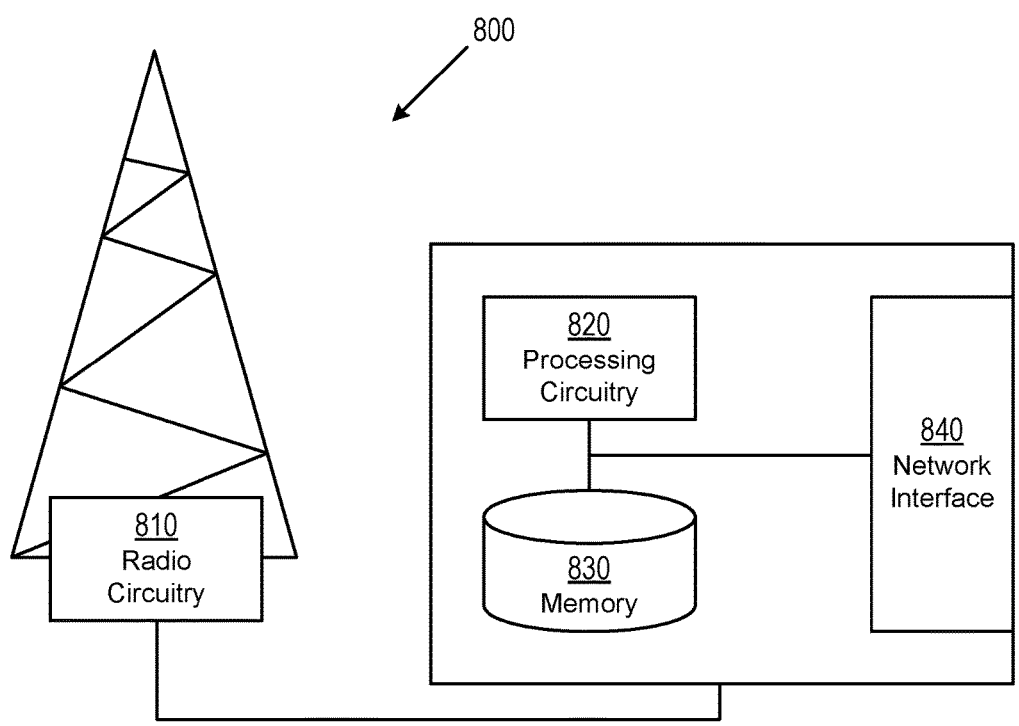
FIG. 10 is a block diagram of another network node.

The example network node 800 in FIG. 10 (which is a network node in the RAN, such as an eNodeB) comprises radio circuitry 810 that is for receiving and transmitting signals from and to UEs over an air interface, processing circuitry 820, a memory 830, and a network interface 840 (for enabling communications with other network nodes in the RAN and/or with network nodes in the core network). In particular embodiments, some or all of the functionality described above as being provided by a network node in a RAN may be provided by the processing circuitry 820 executing instructions stored on a computer-readable medium, such as the memory 830 shown in FIG. 10.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

What is claimed is:

1. A method in a node of a core network in a telecommunication system, the method comprising:
   determining that the mobile terminated data is pending for a user equipment (UE); and
   sending a S1 UE Context Release Command (Cause) message with a cause value from a mobility management entity (MME) of the core network to a network node in a radio access network (RAN) that the mobile terminated data is pending for the UE in order for the network node in the RAN to set a release timer value of a release timer to a larger value than a radio release control (RRC) inactivity timer, when establishing a mobile terminated communication to the UE, via a RRC connection, for the UE to receive the mobile terminated data and for the network node in the RAN to release the RRC connection to the UE when the release timer has expired, instead of the RRC inactivity timer, to provide additional time for reception of the mobile terminated data b" the UE.

2. The method according to claim 1, wherein the network node of the RAN is an Evolved Node B (eNodeB), a radio network controller (RNC), a NodeB, a base station controller (BSC), or a base transceiver station (BTS).

3. A non-transitory computer-readable storage medium having computer code stored therein, which when executed by a processor of a node of a core network in a telecommunication system, cause the node of the core network to perform operations comprising:
   determining that mobile terminated data is pending for a user equipment (UE); and
   sending a S1 UE Context Release Command (Cause) message with a cause value from a mobility management entity (MME) of the core network to a network node in a radio access network (RAN) that the mobile terminated data is pending for the UE, in order for the network node in the RAN to set a release timer value of a release timer to a larger value than a radio release control (RRC) inactivity timer when establishing a mobile terminated communication to the UE, via a RRC connection, for the UE to receive the mobile terminated data and for the network node in the RAN to release the RRC connection to the UE when the release timer has expired, instead of the RRC inactivity timer, to provide additional time for reception of the mobile terminated data by the UE.

4. A node for use in a core network in a telecommunication system comprising:
   a processor adapted to:
   determine that mobile terminated data is pending for a user equipment (UE) and to send a S1 UE Context Release Command (Cause) message with a cause value from a mobility management entity (MME) of the core network to a network node in a radio access network (RAN) that the mobile terminated data is pending for the UE, in order for the network node in the RAN to set a release timer value of a release timer to a larger value than a radio release control (RRC) inactivity timer when establishing a mobile terminated communication to the UE, via a RRC connection, for the UE to receive the mobile terminated data and for the network node in the RAN to release the RRC connection to the UE when the release timer has expired, instead of the RRC inactivity timer, to provide additional time for reception of the mobile terminated data by the UE.

5. The node according to claim 4, wherein the network node of the RAN is an Evolved Node B (eNodeB), a radio network controller (RNC), a NodeB, a base station controller (BSC), or a base transceiver station (BTS).

* * * * *